US010049690B1

(12) United States Patent
Sapozhnikov et al.

(10) Patent No.: US 10,049,690 B1
(45) Date of Patent: Aug. 14, 2018

(54) SELECTABLE READERS FOR BETTER PERFORMANCE

(71) Applicant: Seagate Technology LLC, Cupertino, CA (US)

(72) Inventors: Victor Sapozhnikov, Minnetonka, MN (US); Taras Grigorievich Pokhil, Arden Hills, MN (US); Mohammed Shariat Ullah Patwari, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/671,482

(22) Filed: Aug. 8, 2017

(51) Int. Cl.
  *G11B 5/127* (2006.01)
  *G11B 5/31* (2006.01)

(52) U.S. Cl.
  CPC .......... *G11B 5/3169* (2013.01); *G11B 5/3189* (2013.01); *Y10T 29/49036* (2015.01)

(58) Field of Classification Search
  None
  See application file for complete search history.

(56) References Cited

U.S. PATENT DOCUMENTS

| | | | |
|---|---|---|---|
| 4,636,902 A | 1/1987 | Dalziel et al. | |
| 4,962,437 A * | 10/1990 | Wilcox | G11B 5/3103 360/122 |
| 5,742,995 A * | 4/1998 | Amin | B24B 37/013 29/603.1 |
| 6,104,562 A | 8/2000 | Ottesen et al. | |
| 6,249,890 B1 | 6/2001 | Ukani et al. | |
| 6,320,714 B1 | 11/2001 | Moon et al. | |
| 6,373,649 B1 | 4/2002 | Walker et al. | |
| 6,424,475 B1 | 7/2002 | Bhandari et al. | |
| 6,459,260 B1 | 10/2002 | Bonin et al. | |
| 6,735,062 B1 * | 5/2004 | Pokhil | B82Y 10/00 360/324.12 |
| 7,075,761 B2 * | 7/2006 | Parker | B82Y 10/00 360/324.12 |
| 7,102,842 B1 | 9/2006 | Howard | |
| 7,508,619 B2 | 3/2009 | Okamoto et al. | |
| 7,532,437 B2 | 5/2009 | Liu et al. | |
| 8,289,644 B2 | 10/2012 | Holmberg | |
| 8,289,662 B2 | 10/2012 | Iben | |
| 8,310,782 B2 | 11/2012 | Song et al. | |
| 8,339,752 B1 * | 12/2012 | Hattori | G11B 5/3163 29/603.1 |

(Continued)

OTHER PUBLICATIONS

Office Action from U.S. Appl. No. 14/996,833, dated Mar. 22, 2017, 12 pages.

*Primary Examiner* — William J Klimowicz
(74) *Attorney, Agent, or Firm* — Westman, Champlin & Koehler, P.A.

(57) ABSTRACT

A method of forming a read head. The method includes forming first and second read sensors that are substantially trapezoidal in shape. A first read measurement is performed on a storage medium using the first read sensor. A second read measurement is performed on the storage medium using the second read sensor. Based on a comparison of the first and second read measurements to a predetermined quantity, either the first read sensor or the second read sensor is selected to be operational in a data storage device.

15 Claims, 12 Drawing Sheets

(56) References Cited

U.S. PATENT DOCUMENTS

| | | | |
|---|---|---|---|
| 8,582,251 B2* | 11/2013 | Gao | B82Y 25/00 360/324.12 |
| 8,693,126 B2 | 4/2014 | Buckholdt et al. | |
| 8,724,265 B2* | 5/2014 | Qiu | G11B 5/3932 360/324.12 |
| 9,099,103 B1 | 8/2015 | Krichevsky | |
| 9,142,246 B1* | 9/2015 | Trantham | G11B 19/048 |
| 9,251,856 B1* | 2/2016 | Wheelock | G11B 27/36 |
| 9,286,926 B1 | 3/2016 | Dhanda et al. | |
| 9,299,369 B1 | 3/2016 | Biskeborn et al. | |
| 9,361,916 B1* | 6/2016 | Chung | B24B 37/048 |
| 9,387,568 B1* | 7/2016 | Ilaw | B24B 37/048 |
| 9,396,745 B2 | 7/2016 | Masken et al. | |
| 9,401,161 B1 | 7/2016 | Jury et al. | |
| 9,401,167 B2 | 7/2016 | Pokharel et al. | |
| 9,449,622 B2* | 9/2016 | Biskeborn | G11B 5/3945 |
| 9,576,597 B2* | 2/2017 | Trantham | G11B 5/5543 |
| 9,865,301 B1* | 1/2018 | Wiesen | G11B 20/1879 |
| 2002/0112343 A1* | 8/2002 | Goubau | B24B 37/048 29/603.09 |
| 2007/0236819 A1 | 10/2007 | Hashizume | |
| 2008/0036455 A1 | 2/2008 | Beach et al. | |
| 2008/0231985 A1* | 9/2008 | Okamoto | G11B 5/1278 360/75 |
| 2009/0251821 A1 | 10/2009 | Song et al. | |
| 2010/0007986 A1 | 1/2010 | Mak et al. | |
| 2011/0007426 A1 | 1/2011 | Qiu et al. | |
| 2011/0050211 A1 | 3/2011 | Gao et al. | |
| 2011/0051294 A1 | 3/2011 | Gao et al. | |
| 2011/0134572 A1* | 6/2011 | Qiu | B82Y 25/00 360/313 |
| 2012/0206830 A1 | 8/2012 | Gao et al. | |
| 2013/0314816 A1 | 11/2013 | Gao et al. | |
| 2014/0063644 A1* | 3/2014 | Lou | G11B 5/4886 360/75 |
| 2014/0153134 A1 | 6/2014 | Han et al. | |
| 2015/0117173 A1 | 4/2015 | Green et al. | |
| 2015/0248904 A1 | 9/2015 | Aoyama et al. | |
| 2016/0125900 A1 | 5/2016 | Biskehorn et al. | |

\* cited by examiner

SELECTABLE READERS FOR BETTER PERFORMANCE

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air, for example, and the actuator arm pivots to movably position the slider with respect to the disc.

As areal recording densities for storage discs increase, technological advances and changes to various components of the disc drives are needed.

SUMMARY

The present disclosure relates to fabricating a read head or read transducer with multiple read sensors (e.g., trapezoidal read sensors) and then selecting one of the read sensors that is most suitable for operation in a data storage device such as a disc drive.

In one embodiment, a method of forming a read head is provided. The method includes forming first and second read sensors that are substantially trapezoidal in shape. A first read measurement is performed on a storage medium using the first read sensor. A second read measurement is performed on the storage medium using the second read sensor. Based on a comparison of the first and second read measurements to a predetermined quantity, either the first read sensor or the second read sensor is selected to be operational in a data storage device.

This summary is not intended to describe each disclosed embodiment or every implementation of the selectable readers. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments described below relate to fabrication of a read head or read transducer with multiple read sensors (e.g., trapezoidal read sensors), and then selecting one of the read sensors that is most suitable for operation in a data storage device such as a disc drive. However, prior to providing additional details regarding the different embodiments, a description of an illustrative operating environment is provided below.

Figure 1:
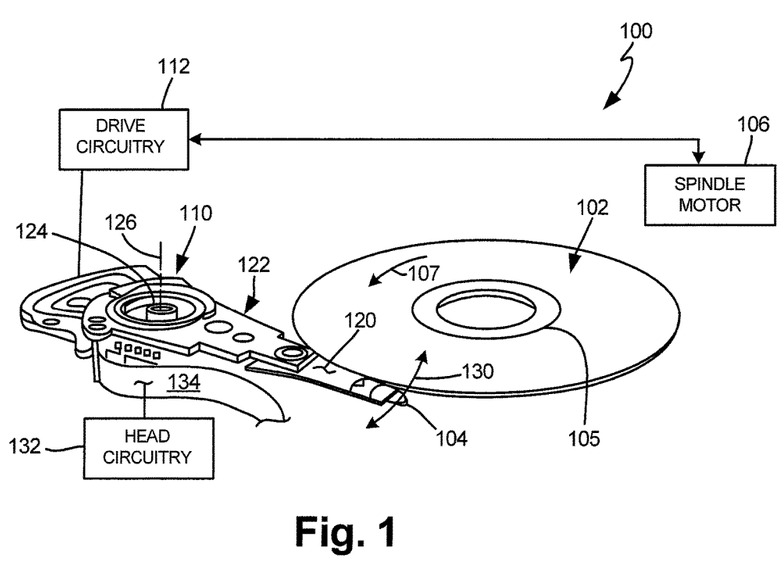
FIG. 1 illustrates an embodiment of a data storage device in which embodiments of the present application can be used.

FIG. 1 shows an illustrative operating environment in which certain reader embodiments formed as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and writing data to the data storage medium. As shown in FIG. 1, the data storage device 100 includes a data storage medium or disc 102, which may be a magnetic storage disc, and a head 104. The head 104 including transducer elements (not shown in FIG. 1) is positioned above the data storage medium 102 to read data from and write data to the data storage medium 102. For read and write operations, a spindle motor 106 (illustrated schematically) rotates the medium 102 as illustrated by arrow 107 and an actuator mechanism 110 positions the head 104 relative to data tracks (e.g., track 105) on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
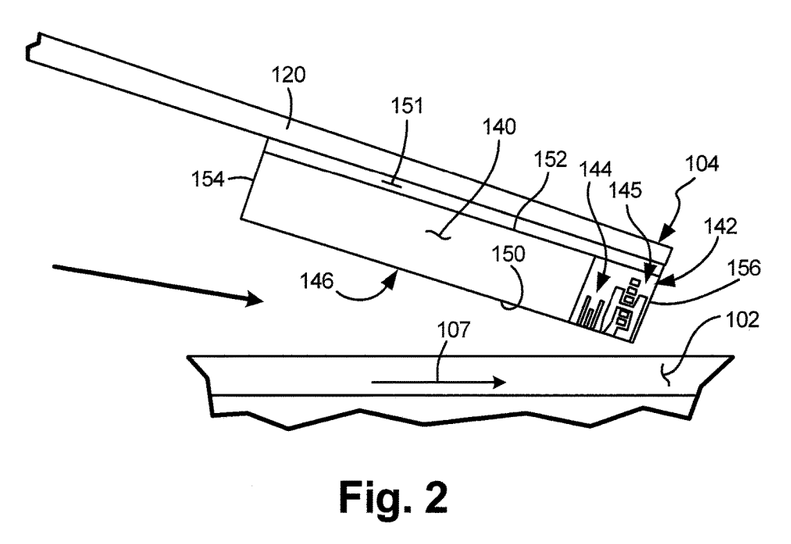
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown in FIG. 2 includes a read element 144 and a write element 145. Alternatively, the head 104 may be a head exclusively for reading that includes only the read element 144 and no write element 145.

As shown, the head 104 includes a bearing surface (for example, an air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2 along the ABS 146 of the slider 140 from a leading edge 154 to the trailing edge 156 of the slider 140 or head 104. Air flow along the air bearing surface 146 creates a pressure profile to support the head 104 and slider 140 above the medium 102 for read and write operations. As shown, the transducer portion 142 is formed at or near the trailing edge 156 of the slider 140.

Figure 3A:
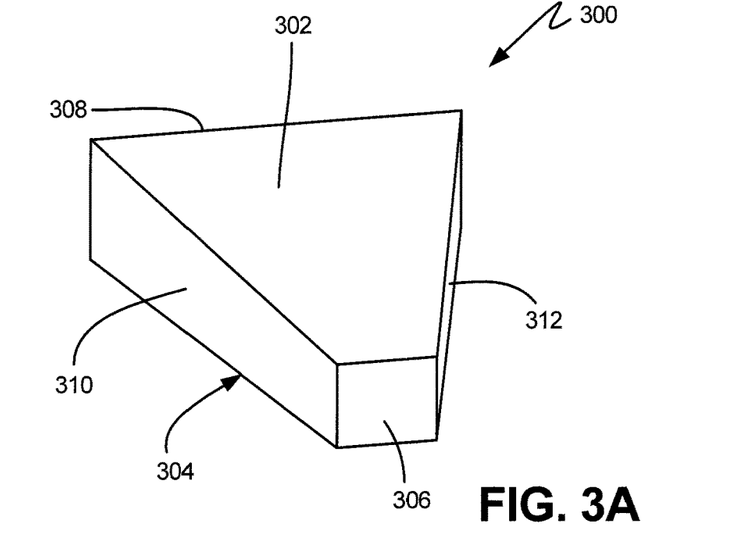
FIG. 3A is a diagrammatic illustration of a trapezoidal read sensor.
Figure 3B:
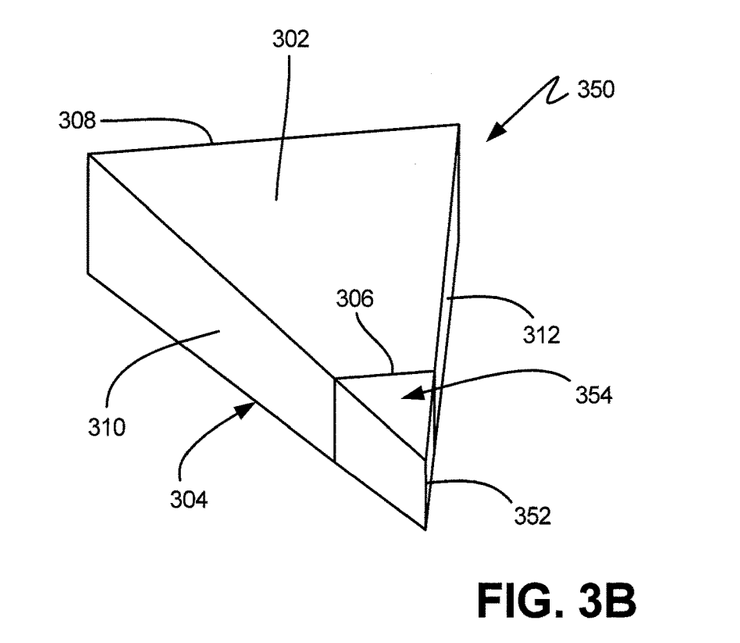
FIG. 3B is a diagrammatic illustration of a triangular read sensor structure from which the trapezoidal read sensor of FIG. 3A may be formed.

In embodiments of the disclosure, transducer portion 142 includes multiple trapezoidal read sensors. An example of one such trapezoidal read sensor 300 is shown in FIG. 3A. Trapezoidal read sensor 300 includes an upper surface 302, a lower surface 304, a front surface 306, a rear surface 308 and side surfaces 310 and 312. Front surface 306 of the trapezoidal sensor 300 forms a portion of bearing surface 146 shown in FIG. 2. Both upper surface 302 and lower surface 304 of sensor 300 are trapezoidal in shape, and front surface 306 and rear surface 308 are rectangular in shape. If separation distances between the upper surface 302 and the lower surface 304 of sensor 300 are the same at both the front and the rear ends, then side surfaces 310 and 312 of trapezoidal read sensor 300 are also rectangular in shape. If a separation distance between the upper surface 302 and the lower surface 304 of sensor 300 at the front end is different from the separation distance between the upper surface 302 and the lower surface 304 at the rear end, then sides surface 310 and 312 of trapezoidal read sensor 300 may be trapezoidal in shape. As will be described below, trapezoidal sensor 300 is formed by carrying out a lapping operation on a triangular read sensor structure 350 shown in FIG. 3B having a front edge 352. The lapping operation is carried out such that a portion 354, for example, of triangular read sensor structure 350 is removed to provide trapezoidal read sensor 300. A general description for forming a transducer portion such as 142 (of FIG. 2) with trapezoidal read sensors such as 300 is provided below in connection with FIGS. 4, 5A and 5B.

Figure 4:
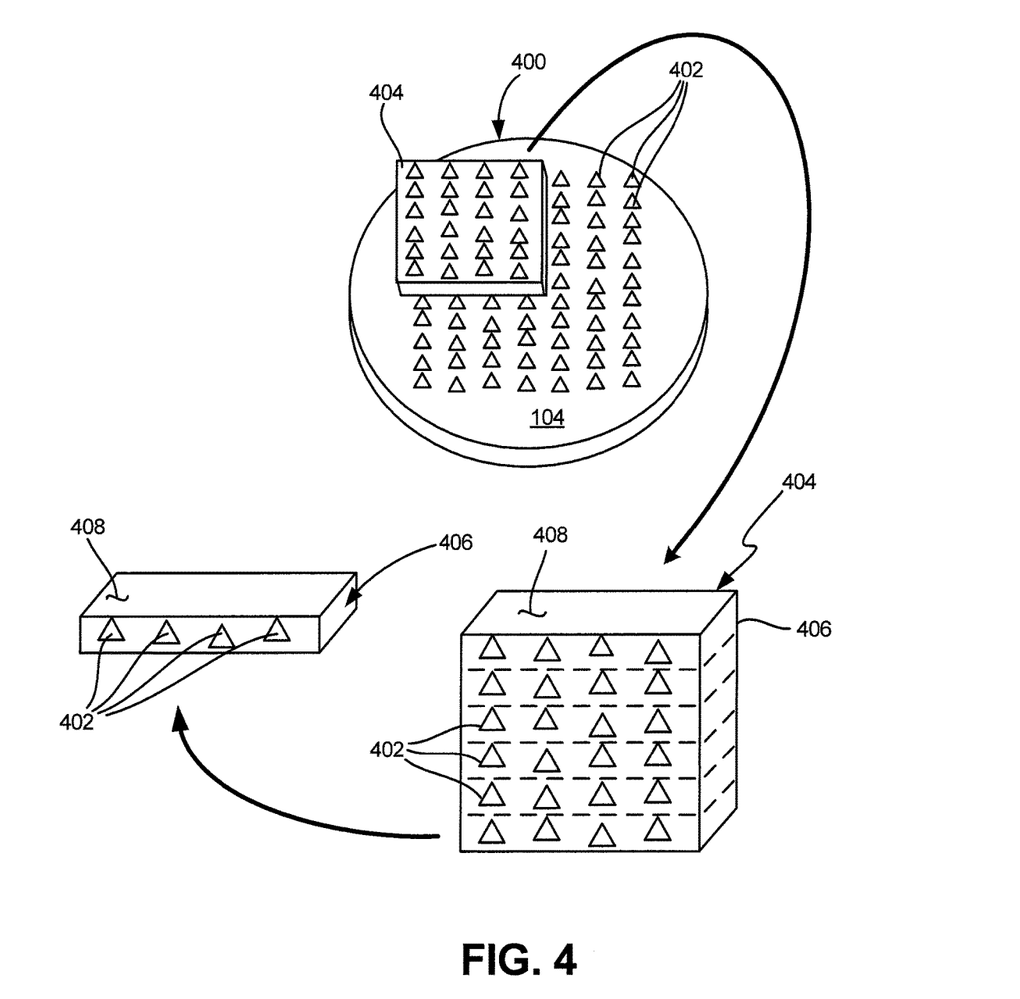
FIG. 4 is a schematic illustration of a wafer fabrication sequence for heads of a data storage device.

FIG. 4 illustrates a wafer 400 for fabricating multiple heads or sliders that may include transducer portions such as 142 (of FIG. 2). As shown, an array of triangular read sensor structures 402 is deposited or formed on the wafer 400 using suitable thin film deposition techniques. Following deposition of the triangular read sensor structures 402, the wafer 400 is cut into slider bar stacks or chunks 404 including multiple slider bars 406. In different applications, the slider bar stack or chunk 404 may include any suitable number of slider bars 406. As can be seen in FIG. 4, bars 406 are cut from the stack 404. Each of the slider bars 406 of the stack 404 has a front surface 408, which is lapped to form a bearing surface (for example, an air bearing surface) of the slider in a manner described below in connection with FIGS. 5A and 5B.

Figure 5A:
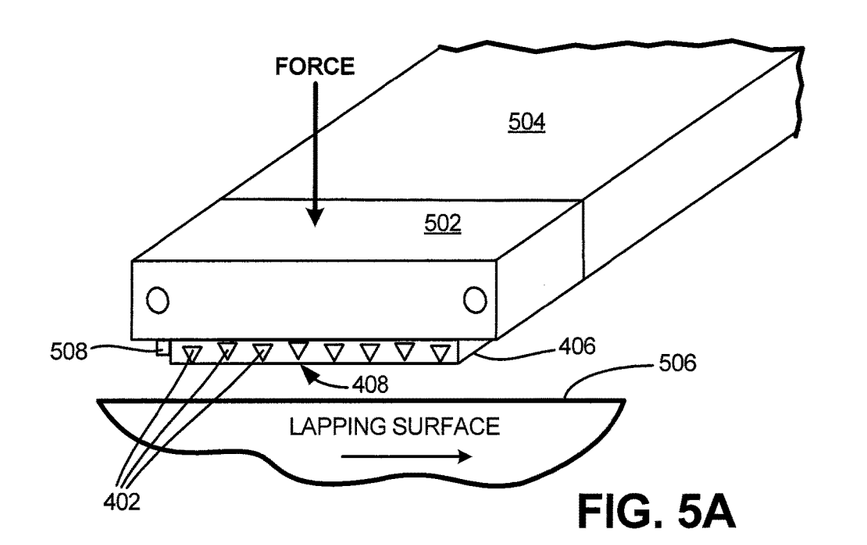
FIG. 5A is a diagrammatic illustration of a portion of a lapping assembly utilized for carrying out a lapping operation on a bar including triangular read sensor structures.
Figure 5B:
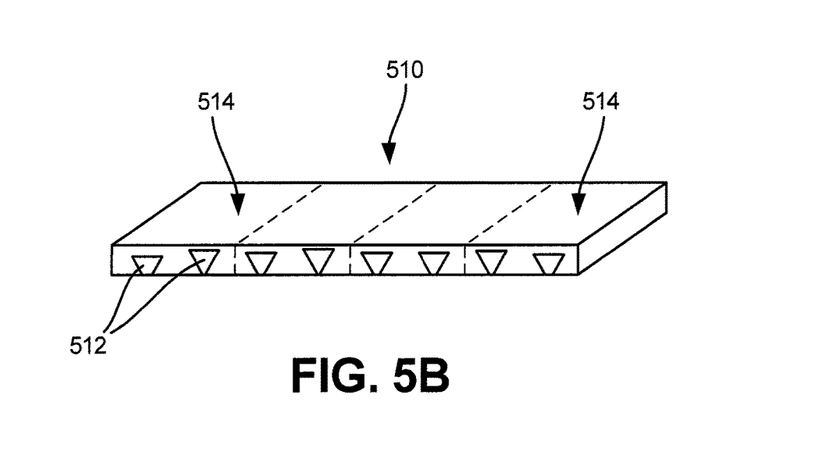
FIG. 5B is a diagrammatic illustration of the bar of FIG. 5A after a lapping operation is complete.

FIG. 5A schematically illustrates a portion of an assembly 500 for lapping a slider bar 406. As shown in FIG. 5A, the bar 406 is coupled to a carrier 502 which connects to a lapping arm 504. The lapping arm 504 supports the bar 406 above an abrasive lapping surface 506 as shown in FIG. 5A. Typically, the abrasive lapping surface 506 is formed on a rotating platen, and the lapping arm 504 is pivotally supported relative to a frame structure to move the lapping arm 504 relative to the abrasive lapping surface 506 and bias the arm 504 towards the abrasive lapping surface 506 for material removal. Force is applied to carrier 502 through one or more elements (not shown). The force is transmitted the bar 406 via the carrier 502 during the lapping process. A lapping sensor 508, which is attached to bar 406, measures a resistance value (or other suitable value) that changes during the lapping process. When the resistance value measured by the lapping sensor 508 reaches a target value, the lapping process is stopped. As can be seen in FIG. 5B, as a result of the material removal process during lapping, the triangular read sensor structures 402 shown in FIG. 5A are converted to trapezoidal read sensors 512 in lapped bar 510. The lapped bar 510 may be cut into individual sliders 514, with each slider 514 including multiple (e.g., 2) trapezoidal read sensors 512. As will be described further below, in each slider 514, one of the trapezoidal read sensors 512 that has an electrical reader width closest to a target electrical reader width is selected to be operational in the data storage drive. Some reasons for including multiple trapezoidal read sensors 512 in a single slider and then selecting one to be operational in the data storage device are provided below.

Figure 6:
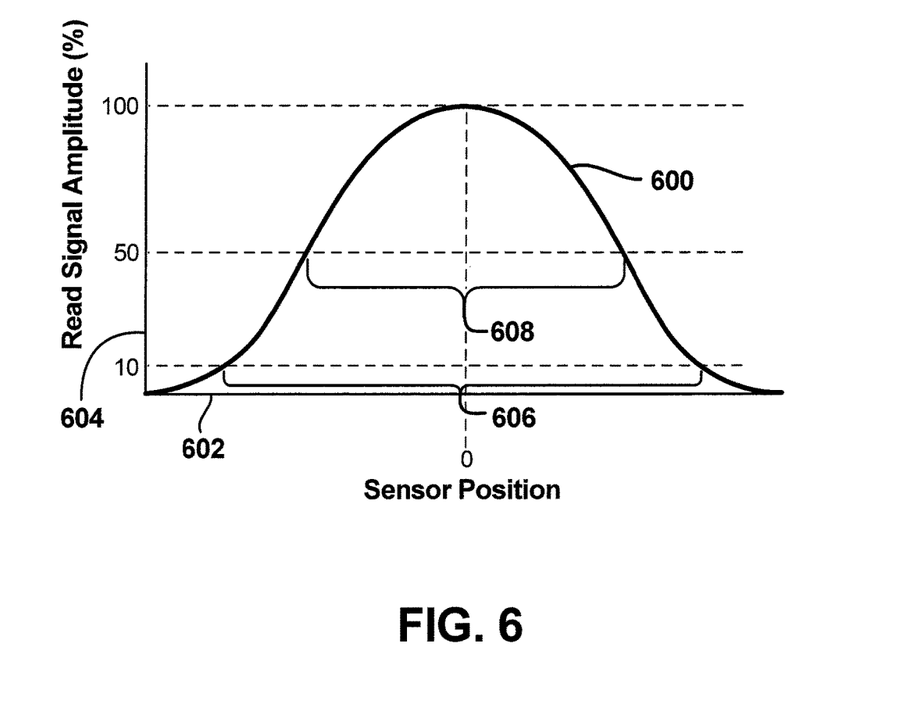
FIG. 6 is a graph illustrating a determination of MT10 and MT50.

A trapezoidal read sensor brings a significant areal density capability (ADC) improvement over a conventional rectangular read sensor. However, compared to conventional rectangular read sensors, an amount of variation in electrical reader width values (quantified by sigma or standard deviation) in a group of trapezoidal read sensors is substantially high. The amount of variation in electrical reader width values for the trapezoidal sensors may be characterized by, for example, MT10 sigma, which is a standard deviation value of MT10. FIG. 6 is a graph including a plot 600, which is utilized to generally illustrate a determination of MT10 and MT50 for a single read sensor. To obtain values used to provide plot 600, the sensor is positioned over a narrow track (or micro track (MT)) on a data storage disc, and read signals are obtained. Specifically, read signals are obtained when the sensor is positioned directly above the track (e.g., a maximum read signal position), and when the sensor is moved to different positions on either side (e.g., left and right sides) of the track. In FIG. 6, horizontal axis 602 represents sensor position, with 0 being the sensor position directly above the track. Vertical axis 604 represents read signal amplitude in percentage. In FIG. 6, distance 606 represents MT10, which is a distance between two positions on either side of a maximum read signal position at which the signal strength decreases to 10% of its maximum. MT50, which may also be used to characterize electrical reader width, is a distance 608 between two positions on either side of the maximum read signal position at which the signal strength decreases to 50% of its maximum.

As indicated above, MT10 sigma is higher in trapezoidal read sensors. The extra MT10 sigma in trapezoidal read sensors may be because of (1) lithographical errors—during fabrication, the position of the tip of the triangle to be lapped to a trapezoid has an error, and (2) lapping errors—due to the sloped sides, lapping sigma is translated into reader width (RW) sigma and thus to MT10 sigma. For instance, if lapping sigma is 2 nanometers (nm), then, due to that alone, the RW sigma for a trapezoid with a 1:2 slope will also be 2 nm (1 nm on either side). MT10 sigma therefore will also be close to 2 nm.

Figure 7:
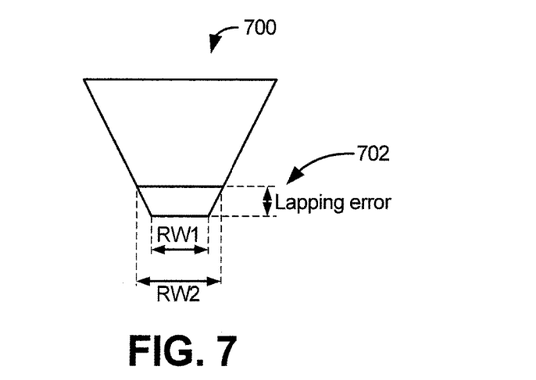
FIG. 7 is a diagrammatic illustration of a trapezoidal read sensor.

FIG. 7 is a diagrammatic illustration of a trapezoidal sensor 700 in which a translation of a lapping error into a change in RW is illustrated. In FIG. 7, the lapping error is denoted by reference numeral 702. As can be seen in FIG. 7, lapping error 702 is substantially equal to a difference between first read width (RW1) and second read width (RW2). As indicated above, changes in physical reader width (e.g., change from RW1 to RW2) cause corresponding changes in electrical reader width (e.g., MT10).

To help address the extra MT10 sigma in trapezoidal read sensors, in different embodiments of the disclosure, a read head or read transducer is formed with multiple trapezoidal read sensors, and then one of the read sensors that has a most suitable electrical reader width (e.g., closest to a target electrical width) is selected for operation in a data storage device such as a disc drive. One embodiment described below takes advantage of a natural variability in the positions of the tips (or front edges) of the triangular read sensor structures being lapped to form trapezoidal read sensors. Choosing the read sensor or reader with a better MT10 will reduce the MT10 sigma and thus alleviate/resolve the MT10 issue in trapezoidal readers.

Figure 8A:
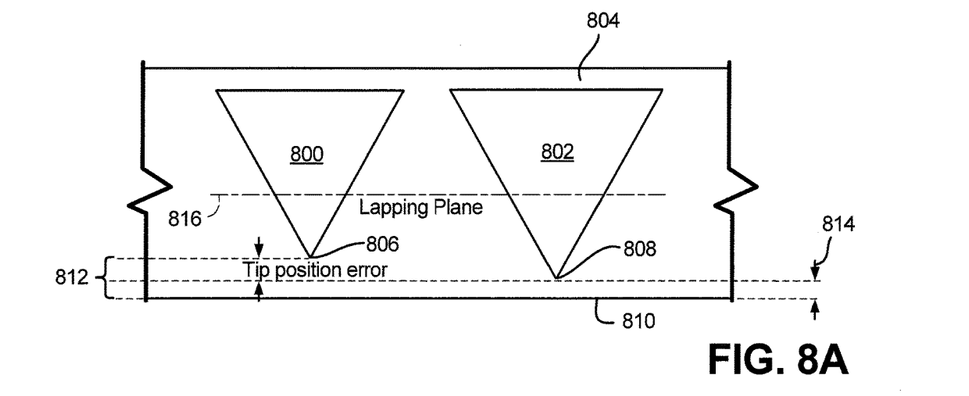
FIG. 8A is a diagrammatic illustration including multiple triangular read sensor structures from which multiple trapezoidal read sensors are formed in accordance with a first embodiment.

FIG. 8A illustrates an example of natural variation in the positions of front edges of adjacent first and second triangular read sensor structures 800 and 802 in a manufactured bar 804 before the bar 804 is lapped. In FIG. 8A, the front edges of triangular read sensor structures 800 and 802 are denoted by reference numerals 806 and 808, respectively, and a front surface of bar 804 is denoted by reference numeral 810. In the embodiment of FIG. 8A, to illustrate the natural variation in the positions of the front edges 806 and 808, front edge 806 of the first triangular read sensor structure 800 is shown at a first distance 812 from the front surface 810 of the bar 804, and front edge 808 of the second triangular read sensor structure 802 is shown at a second distance 814 from the front surface 810 of the bar 804. It should be noted that the first distance 812 and/or the second distance 814 may be 0 or greater than zero, and FIG. 8A simply illustrates one possibility of natural variation.

Figure 8B:
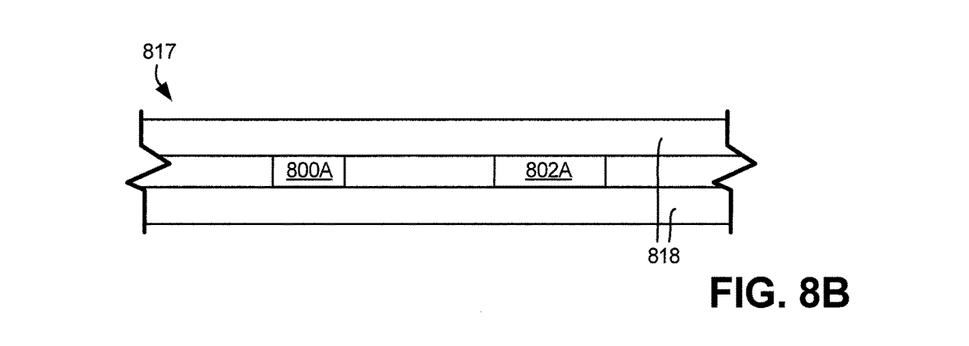
FIG. 8B is a bearing surface view of the trapezoidal read sensors formed from the triangular read sensor structures of FIG. 8A.
Figure 8C:
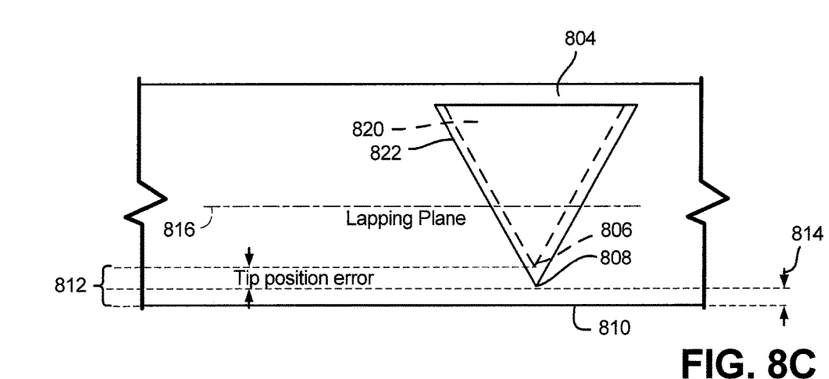
FIG. 8C is a diagrammatic illustration including multiple triangular read sensor structures from which multiple trapezoidal read sensors are formed in accordance with a second embodiment.
Figure 8D:
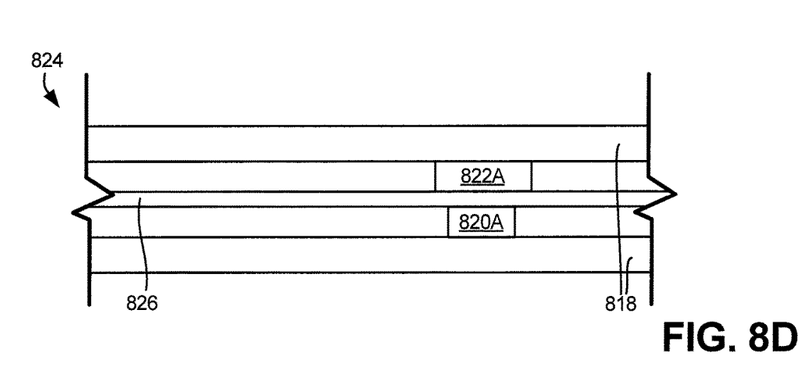
FIG. 8D is a bearing surface view of the trapezoidal read sensors formed from the triangular read sensor structures of FIG. 8C.

To form a slider that includes two trapezoidal read sensors, front surface 810 of the bar 804 is lapped in a manner described in connection with FIG. 5A. A lapping plane 816 denotes a plane at which lapping is terminated to provide the first and second trapezoidal read sensor structures having read widths RW1 and RW2, respectively. After the lapping operation is complete, the bar 806 is cut into individual sliders such that the first and second trapezoidal read sensor structures having read widths RW1 and RW2 are part of a same slider. FIG. 8B illustrates a bearing surface of the trapezoidal read sensors included in a single slider. In FIG. 8B, the trapezoidal read sensors are denoted by 800A and 802A, respectively, and the single slider is denoted by reference numeral 817. Read shields above and below sensors 800A and 802A are denoted by reference numeral 818. In should be noted that the trapezoidal read sensors 800A and 802A are substantially coplanar in the embodiment of FIG. 8B. However, in some embodiments, fabrication may be carried out such that adjacent vertically stacked triangular read sensor structures shown in FIG. 8C and denoted by reference numerals 820 and 822 are included in a bar. FIG. 8D illustrates a bearing surface view of vertically stacked trapezoidal read sensors formed from triangular read sensor structures 820 and 822. In FIG. 8D, the vertically stacked trapezoidal read sensors are denoted by 820A and 822A, respectively, and a single slider that includes the sensors 820A and 822A is denoted by reference numeral 824. In addition to top and bottom read shields 818, a mid-shield 826 may be included between read sensors 820A and 822A as shown in FIG. 8D.

In the embodiment of FIG. 8B, for example, the trapezoidal read sensors 800A and 802A of the slider 816 may be tested to obtain electrical reader widths (e.g., MT10 values). The MT10 values may then be compared to a target MT10 value, and the trapezoidal read sensor 800A, 802A having its MT10 value closest to the target MT10 value may be selected to be operational in a data storage drive (e.g., by connecting the selected trapezoidal read sensor 800A, 802A to a preamplifier in a disc drive.) A similar selection and connection technique may be employed to utilize a preferred one of sensors 820A and 822A shown in FIG. 8D. Selecting readers in this manner helps alleviate electrical reader width sigma (e.g., MT10 sigma) in trapezoidal read sensors. In some embodiments, to further reduce electrical reader width sigma (e.g., MT10 sigma), intermediate triangular read sensor structures may be manufactured such that the tip or front edge of one intermediate triangular read sensor structure is intentionally shifted in respect to the other intermediate triangular read sensor structure. This will allow compensating an even bigger error in lapping.

Figure 9A:
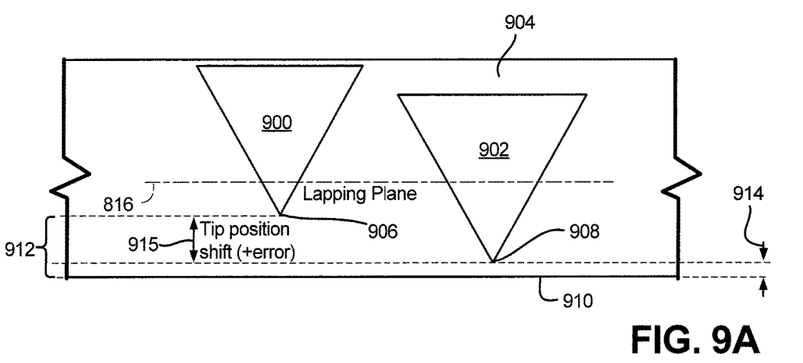
FIG. 9A is a diagrammatic illustration including multiple triangular read sensor structures from which multiple trapezoidal read sensors are formed in accordance with a third embodiment.
Figure 9B:
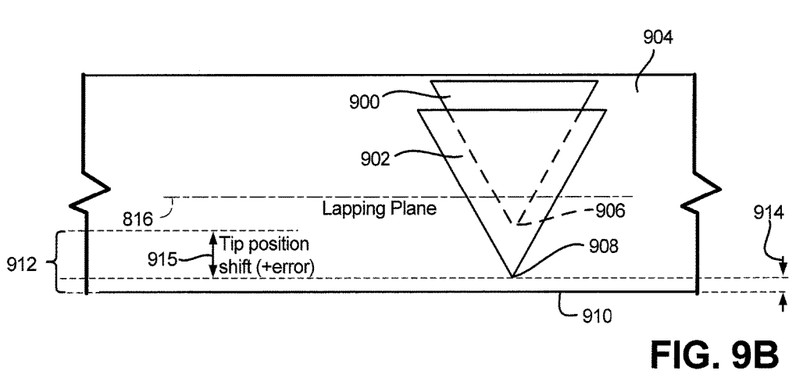
FIG. 9B is a diagrammatic illustration including multiple triangular read sensor structures from which multiple trapezoidal read sensors are formed in accordance with a fourth embodiment.

FIG. 9A illustrates an example of intentional shifting of the positions of front edges of adjacent first and second triangular read sensor structures 900 and 902. Specifically, a bar 904 is fabricated with intentionally shifted relative positions of front edges of adjacent first and second triangular read sensor structures 900 and 902. In FIG. 9A, the front edges of triangular read sensor structures 900 and 902 are denoted by reference numerals 906 and 908, respectively, and a front surface of bar 904 is denoted by reference numeral 910. In the embodiment of FIG. 9A, to illustrate the intentional shifting in the positions of the front edges 906 and 908, front edge 906 of the first triangular read sensor structure 900 is shown at a first distance 912 from the front surface 910 of the bar 904, and front edge 908 of the second triangular read sensor structure 902 is shown at a substantially small second distance 914 from the front surface 910 of the bar 904. In FIG. 9A, reference numeral 915 indicates the intentional tip or front edge position shift plus a possible error. The lapping and slicing operations are carried out in a manner described above in connection with FIG. 8A and therefore that description is not repeated in connection with FIG. 9A in the interest of brevity. Also, in the interest of brevity, a bearing surface view of the type shown in FIG. 8B is not repeated for the embodiment of FIG. 9A. However, another embodiment of the type shown in FIG. 8C is shown in FIG. 9B for a stacked configuration of intentionally shifted intermediate triangular read sensor structures 920 and 922, which may be lapped and sliced in a manner described above to form a single slider with two trapezoidal read sensors. Measurement of electrical reader width values (e.g., MT10 values), selection of a suitable one of the trapezoidal read sensors and coupling the selected one of the trapezoidal read sensors to a preamplifier in a disc drive may be carried out in a manner described above in connection with FIG. 8A-8D.

An additional benefit of the above-described embodiments is that when both electrical reader width values (e.g., MT10 values) are acceptable, the trapezoidal read sensor with the better bit error rate (BER)/ADC and stability characteristics (e.g., bits-in-error (BIE) value) may be chosen. For instance, experiments show a 2-3% reader-related ADC sigma in heads that can be utilized by choosing the better trapezoidal read sensor structure.

Figure 10:
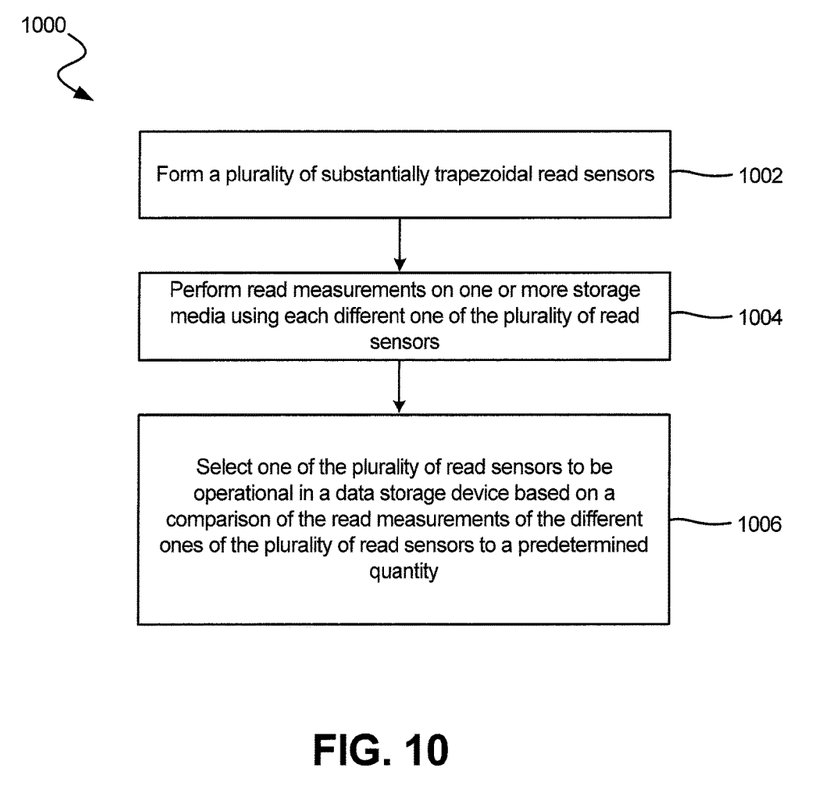
FIG. 10 is a flow diagram of a method embodiment.

FIG. 10 is a simplified flow diagram 1000 of a general method embodiment. At step 1002, a plurality of substantially trapezoidal read sensors (e.g., two or more substantially trapezoidal read sensors) is formed. At step 1004, read measurements are performed on one or more storage media (e.g., storage media in a tester) using each different one of the plurality of read sensors. At step 1006, one of the plurality of read sensors is selected to be operational in a data storage device based on a comparison of the read measurements of the different ones of the plurality of read sensors to a predetermined quantity.

Figure 11A:
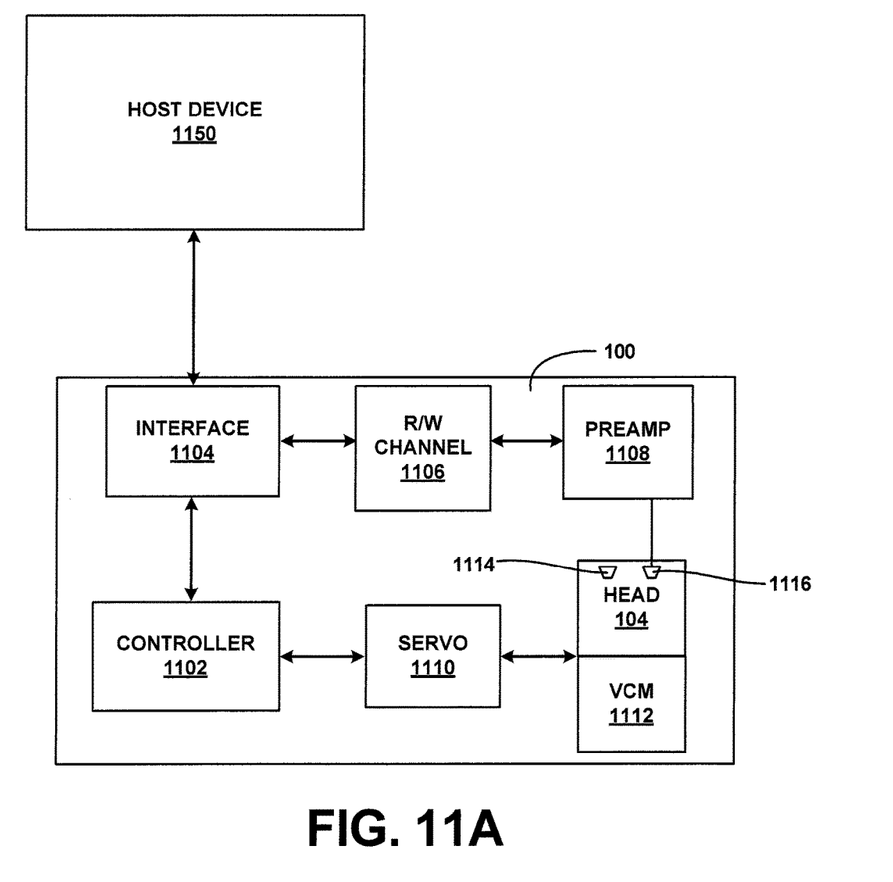
FIGS. 11A and 11B are a generalized functional block diagram of a data storage system.

FIG. 11A is a generalized block diagram of illustrative control circuitry for the device shown in FIG. 1 to which trapezoidal read sensors in accordance with the above embodiments may be connected. The control circuitry includes a processor or controller 1102 that directs or manages the high level operations of device 100. An interface circuit 1104 facilitates communication between device 100 and a host device 1150. A read/write channel 1106 operates in conjunction with a preamplifier/driver circuit (preamp) 1108 to write data to and to read data from a data storage medium such as medium 102 in FIG. 1. Preamp 1108 also optionally acts as a power supply to electrical components included in a recording head such as a read transducer, a write transducer, heaters, etc. Preamp 1108 is illustratively electrically connected to recording head 104 through a head gimbal assembly (HGA) circuit that is connected to preamp 1108 and to one or more recording head 104 electrical connection points. A servo circuit 1110 provides closed loop positional control for voice coil motor 1112 that positions recording head 104.

Figure 11B:
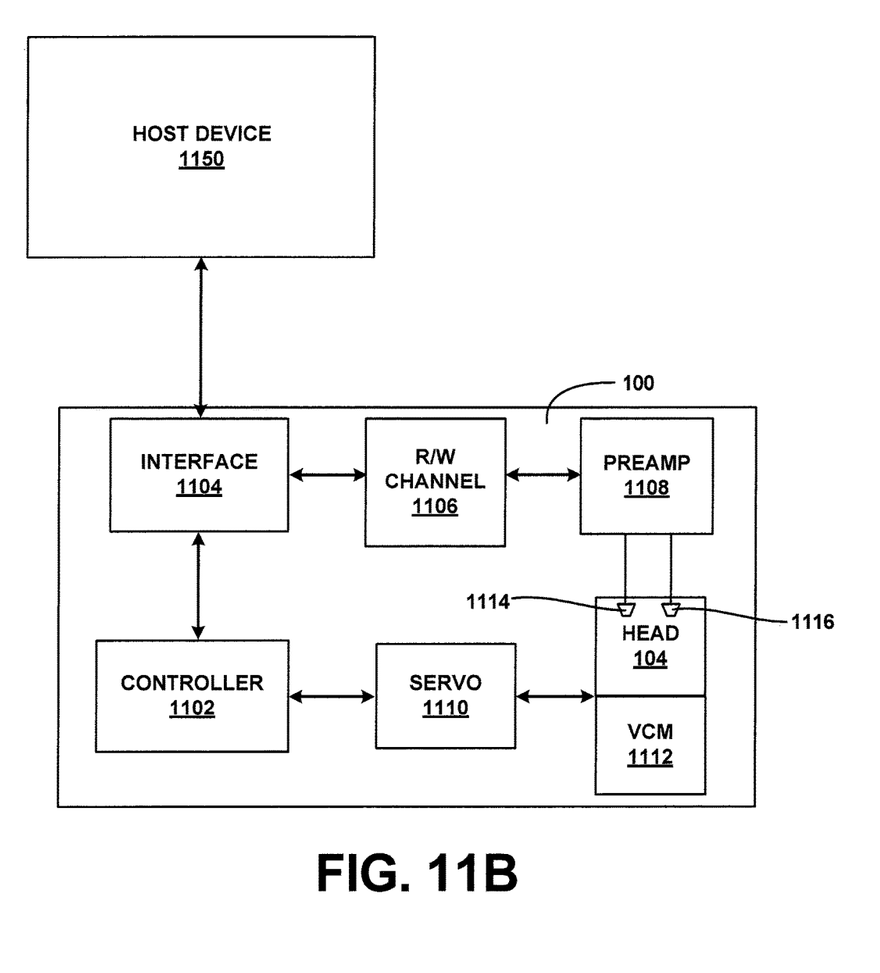

In the embodiment show in FIG. 11A, head 104 includes multiple read sensors (e.g., two trapezoidal read sensors 1114 and 1116) within a single slider. As described above, a better one of the trapezoidal read sensors 1114 and 1116 is selected for operation in the drive. In the embodiment shown in FIG. 11A, element 1116 is determined to be the better trapezoidal read sensor, and only that read sensor 1116 is connected to the preamp 1108 during manufacture of the drive. In an alternate embodiment, which is shown in FIG. 11B, both trapezoidal read sensors 1114 and 1116 are connected to the preamplifier 1108, and the better one of trapezoidal read sensors 1114 and 1116 is determined within the drive (e.g., with the help of controller 202).

The above-described embodiments describe a substantially trapezoidal read sensor formed by lapping an intermediate read sensor structure that is substantially triangular in shape. However, it should be noted that the above-described embodiments may also be employed to form read sensors that have front portions (portions proximate to the bearing surface) that are substantially trapezoidal and rear portions behind the front portions that may have any suitable shape.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of forming a read head, the method comprising:
    forming first and second read sensors that are substantially trapezoidal in shape;
    performing a first read measurement on one or more storage media using the first read sensor;
    performing a second read measurement on the one or more storage media using the second read sensor; and selecting either the first read sensor or the second read sensor to be operational in a data storage device based on a comparison of the first and second read measurements to a predetermined quantity.

2. The method of claim 1 and wherein a value obtained by the first read measurement is a function of an electrical reader width of the first read sensor, and wherein a value obtained by the second read measurement is a function of an electrical reader width of the second read sensor, and wherein the predetermined quantity is a function of a predetermined target electrical reader width.

3. The method of claim 2 and wherein the first read measurement comprises a first MT10 measurement, and wherein the second read measurement comprises a second MT10 measurement, and wherein the predetermined quantity is a target MT10 value.

4. The method of claim 2 and wherein the first read measurement comprises a first MT50 measurement, and wherein the second read measurement comprises a second MT50 measurement, and wherein the predetermined quantity is a target MT50 value.

5. The method of claim 2 and wherein, if the electrical reader width of the first read sensor is substantially similar to the electrical reader width of the second read sensor, then:
carrying out a first bit error rate measurement using the first read sensor to obtain a first bit error rate value, and carrying out a second bit error rate measurement using the second read sensor to obtain a second bit error rate value, and selecting either the first read sensor or the second read sensor to be operational in the data storage device based on a comparison of the first bit error rate value and the second bit error rate value; or
carrying out a first areal density measurement using the first read sensor to obtain a first areal density value, and carrying out a second areal density measurement using the second read sensor to obtain a second areal density value, and selecting either the first read sensor or the second read sensor to be operational in the data storage device based on a comparison of the first areal density value and the second areal density value.

6. The method of claim 1 and wherein forming the first and second read sensors that are substantially trapezoidal in shape comprises:
carrying out a lapping process on first and second intermediate read sensor structures that are triangular in shape, such that the triangular shapes are modified into the trapezoidal shapes,
wherein the first and second intermediate read sensor structures are within a bar that is lapped as part of the lapping process, and
wherein each of the first and second intermediate read sensor structures comprises a front edge that is proximate to a front surface of the bar that is lapped.

7. The method of claim 6 and wherein the front edge of the first intermediate read sensor structure is at a first distance from the front surface of the bar, and wherein the front edge of the second intermediate read sensor structure is at a second distance from the from the front surface of the bar, such that the front edge of the first intermediate read sensor structure is at a predetermined distance in front of or behind the front edge of the second intermediate read sensor structure.

8. The method of claim 1 and wherein the one of the first read sensor or the second read sensor not selected is not utilized to read any user data in the data storage device.

9. A method comprising:
forming a plurality of read sensors with each of the plurality of read sensors having a substantially trapezoidal shape;
performing read measurements on one or more storage media using each different one of the plurality of read sensors; and
selecting one of the plurality of read sensors to be operational in a data storage device based on a comparison of the read measurements of the different ones of the plurality of read sensors to a predetermined quantity.

10. The method of claim 9 and wherein another one of the plurality of read sensors that is not selected is not employed to read any user data in the data storage device.

11. The method of claim 9 and wherein the read measurements on the one or more storage media using each different one of the plurality of read sensors are functions of electrical reader widths of each different one of the plurality of read sensors.

12. The method of claim 9 and wherein the predetermined quantity is a function of a target electrical reader width.

13. The method of claim 9 and wherein forming the plurality of read sensors with each of the plurality of read sensors having a substantially trapezoidal shape comprises:
carrying out a lapping process on a plurality intermediate read sensor structures with each of the plurality of intermediate read sensor structures having a substantially triangular shape, such that the triangular shapes are modified into the trapezoidal shapes,
wherein the plurality of intermediate read sensor structures is within a bar that is lapped as part of the lapping process, and
wherein each of the plurality of intermediate read sensor structures comprises a front edge that is proximate to a front surface of the bar that is lapped.

14. The method of claim 13 and wherein the front edge of a first intermediate read sensor structure of the plurality of intermediate read sensor structures is at a first distance from the front surface of the bar, and wherein the front edge of a second intermediate read sensor structure of the plurality of intermediate read sensor structures is at a second distance from the from the front surface of the bar, such that the front edge of the first intermediate read sensor structure is at a predetermined distance in front of or behind the front edge of the second intermediate read sensor structure.

15. The method of claim 9 and wherein the read measurements on the one or more storage media using each different one of the plurality of read sensors are functions of MT10 values of each different one of the plurality of read sensors, and wherein the predetermined quantity is a function of a target MT10 value.

* * * * *